US009413971B2

United States Patent
Mitsui

(10) Patent No.: US 9,413,971 B2
(45) Date of Patent: Aug. 9, 2016

(54) OPENING AND CLOSING DEVICE, AND ELECTRONIC DEVICE

(71) Applicant: MITSUBISHI STEEL MFG. CO., LTD., Tokyo (JP)

(72) Inventor: Yasuhiro Mitsui, Chiba (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 0 days.

(21) Appl. No.: 14/816,141

(22) Filed: Aug. 3, 2015

(65) Prior Publication Data

US 2016/0044808 A1 Feb. 11, 2016

Related U.S. Application Data

(63) Continuation of application No. PCT/JP2015/055448, filed on Feb. 25, 2015.

(30) Foreign Application Priority Data

Aug. 7, 2014 (JP) ................................. 2014-161853

(51) Int. Cl.
*H04N 5/225* (2006.01)
*H04N 5/232* (2006.01)
*H05K 5/00* (2006.01)

(52) U.S. Cl.
CPC ......... *H04N 5/23293* (2013.01); *H04N 5/2251* (2013.01); *H05K 5/0017* (2013.01); *G03B 2217/002* (2013.01)

(58) Field of Classification Search
CPC . G06F 1/1607; G06F 1/1605; G03B 2217/00; H04N 5/2252; H04N 5/2251; H04N 5/23293

USPC ..................... 348/333.01, 373, 374
See application file for complete search history.

(56) References Cited

U.S. PATENT DOCUMENTS

| 7,194,290 | B2 * | 3/2007 | Matsunami | H04N 5/64 348/333.06 |
| 7,508,439 | B2 * | 3/2009 | Naito | H04N 5/23293 348/14.07 |
| 2007/0052832 | A1 * | 3/2007 | Bae | H04N 5/23293 348/333.12 |

(Continued)

FOREIGN PATENT DOCUMENTS

| JP | H06-033220 U | 4/1994 |
| JP | 2000-000051 U | 6/2000 |

(Continued)

OTHER PUBLICATIONS

International Search Report mailed on May 19, 2015.

*Primary Examiner* — Twyler Haskins
*Assistant Examiner* — Dwight C Tejano
(74) *Attorney, Agent, or Firm* — IPUSA, PLLC

(57) ABSTRACT

An opening and closing device includes a base plate; a first plate that is pivotably attached to the base plate; a first shaft that is provided in the first plate; a second plate that is pivotably and slidably attached to the first plate; a second shaft that is provided in the second plate; a third plate that is pivotably attached to the second plate; a detachable system for locking the third plate and the first plate when the first plate, the second plate, and the third plate are superposed; a bias system for biasing the second plate to the first plate; and a restriction system for allowing the second plate to slide along the first shaft when the second plate is superposed to the first plate, and for restricting the second plate from sliding when the second plate is rotated relative to the first plate.

11 Claims, 7 Drawing Sheets

(56) References Cited

U.S. PATENT DOCUMENTS

| | | |
|---|---|---|
| 2007/0242150 A1 | 10/2007 | Terada |
| 2009/0115881 A1* | 5/2009 | Joo ..................... H04N 5/2252 348/333.06 |
| 2009/0207303 A1* | 8/2009 | Kusatsugu ............ G03B 13/00 348/376 |
| 2010/0026854 A1* | 2/2010 | Rodriguez ............ H04N 1/195 348/240.99 |
| 2012/0081593 A1 | 4/2012 | Nakagawa et al. |
| 2013/0038769 A1* | 2/2013 | Xiaoping ............. H04N 5/2251 348/333.01 |
| 2013/0093946 A1* | 4/2013 | Nakagawa ........... H04N 5/2252 348/374 |
| 2014/0253777 A1* | 9/2014 | Yamaura .............. H04N 5/2252 348/333.06 |
| 2016/0066451 A1* | 3/2016 | Mitsui ................. H05K 5/0221 348/333.06 |

FOREIGN PATENT DOCUMENTS

| | | |
|---|---|---|
| JP | 2007-286177 | 11/2007 |
| JP | 2012-080400 | 4/2012 |
| JP | 2014-137455 | 7/2014 |

* cited by examiner

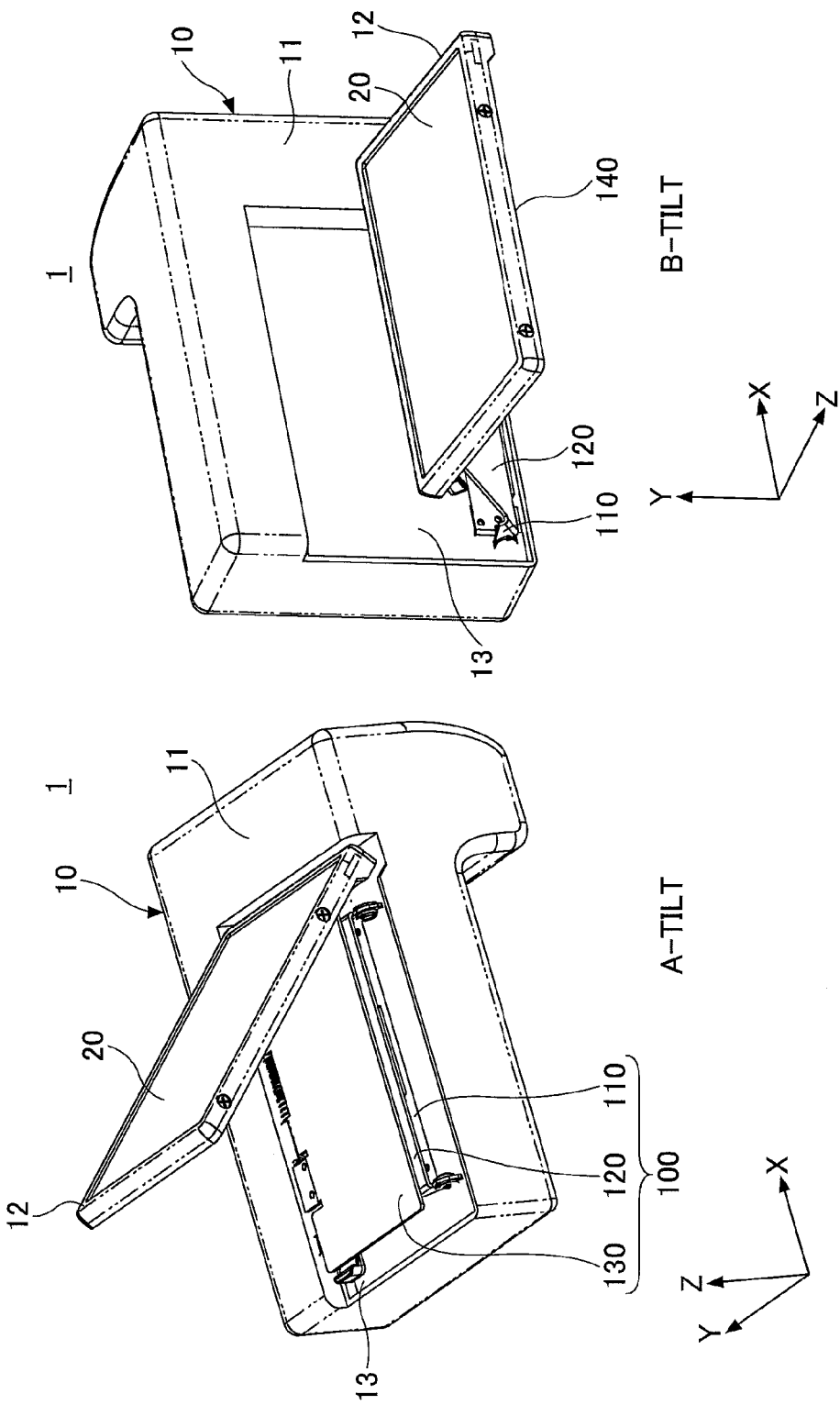

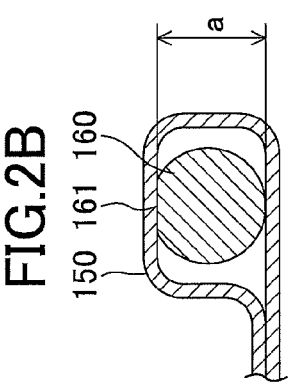
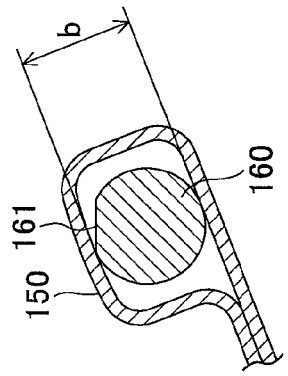
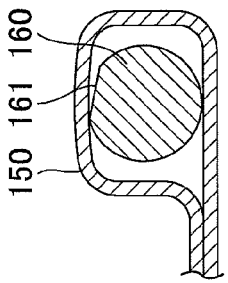
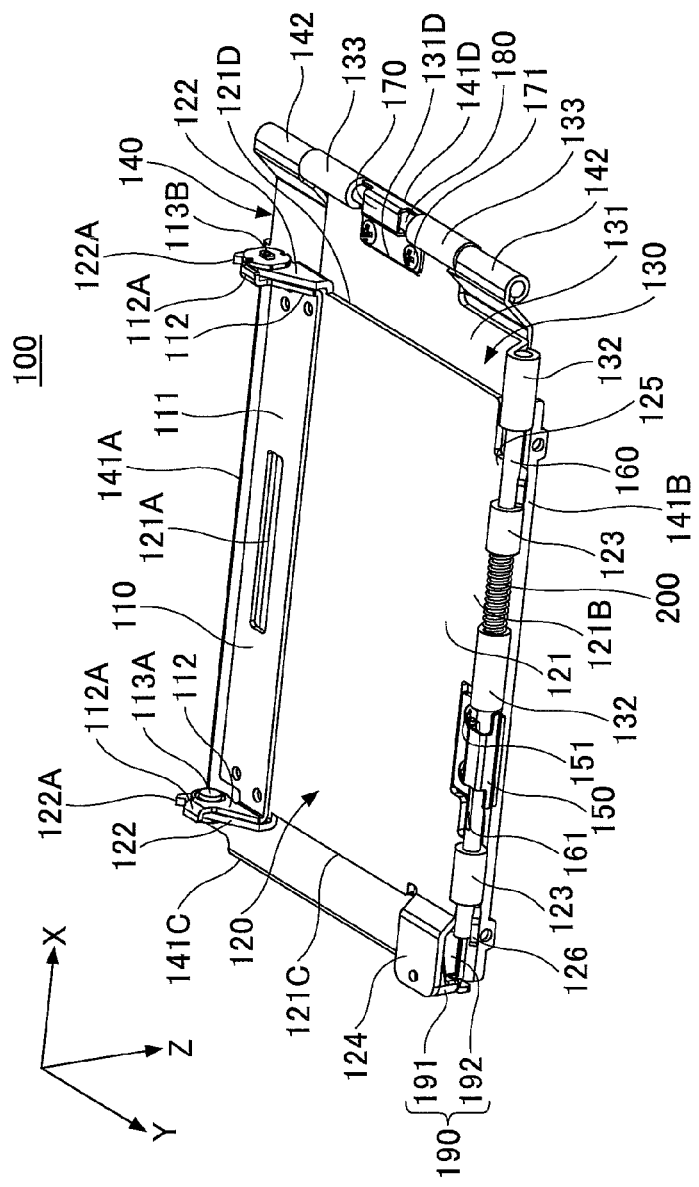
FIG.2A
FIG.2B
FIG.2C
FIG.2D

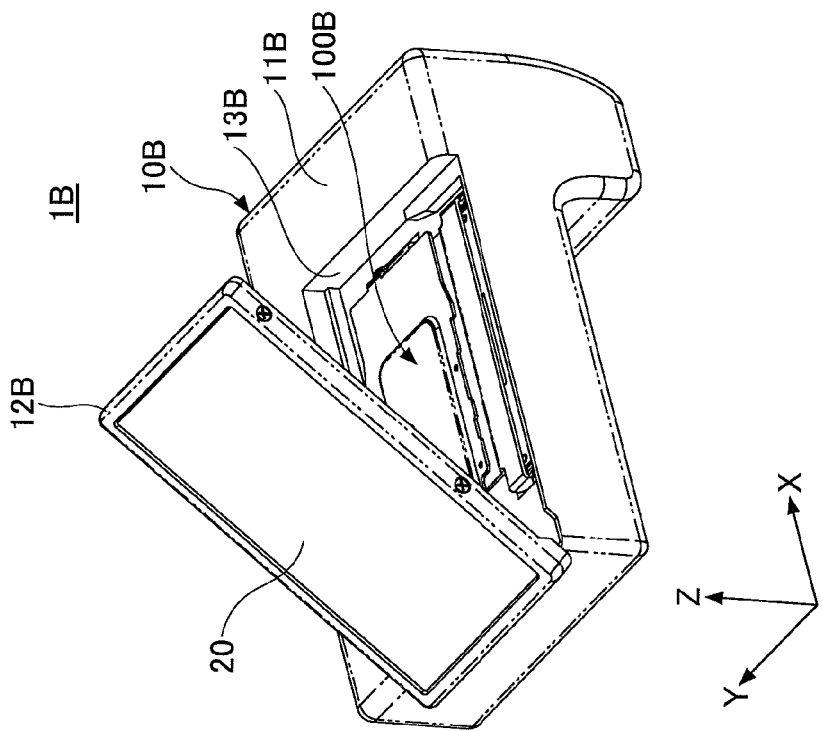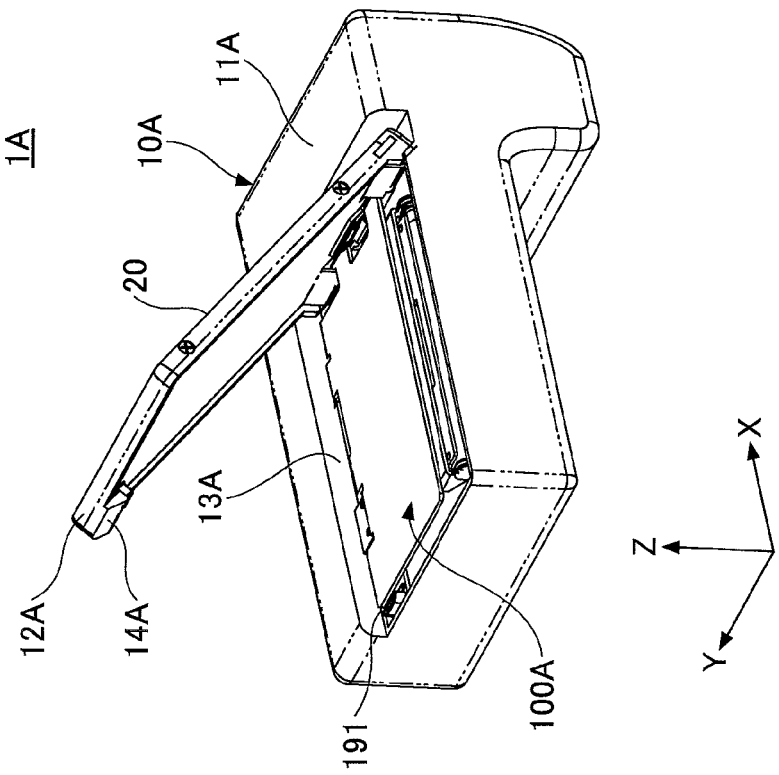

OPENING AND CLOSING DEVICE, AND ELECTRONIC DEVICE

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2015/055448 filed on Feb. 25, 2015 and designating the U.S., which claims priority to Japanese Patent Application No. 2014-161853 filed on Aug. 7, 2014. The entire contents of the foregoing applications are incorporated herein by reference.

BACKGROUND OF THE INVENTION

1. Field of the Invention

The present invention relates to an opening and closing device, and an electronic device.

2. Description of the Related Art

Among electronic devices that are formed by superposing two cases, at least one of which includes a display unit, there has been an electronic device from the past that includes a first connecting rotor that rotates so as to allow the cases to be opened and closed with each other while using one edge as an axis; a second connecting rotor that rotates so as to allow the cases to be opened and closed with each other while using the other edge that is perpendicular to the one edge as an axis; a selector for selecting one of a connection to the first connecting rotor and a connection to the second connecting rotor; and a display switch that is provided in one of the two cases, wherein the display switch causes the two cases to be opened and closed in response to the selected connection that is selected by the selector, and the display switch switches a display mode of the display unit depending on the opening and closing direction (cf. Patent Document 1, for example).
Patent Document 1: Japanese Unexamined Utility Model Publication No. 2000-51

There has been an electronic device that has a configuration such that a display is disposed at a part of one surface of a housing (a case), and the display can be spread by rotating it from the housing. For a case in which the first connecting rotor and the second connecting rotor of the electronic device according to the related art are used for such an electronic device, upon taking out the display from the housing, the display or a cover of the display may interfere with the housing, so that it may be difficult to taking out the display from the housing.

SUMMARY OF THE INVENTION

An object is to provide an opening and closing device and an electronic device such that a display can be easily taken out from a housing.

An opening and closing device according to an embodiment of the present invention includes a base plate; a first plate that is pivotably attached to the base plate; a first shaft that is provided in the first plate; a second plate that is pivotably and slidably attached to the first plate through the first shaft; a second shaft that is provided in the second plate and that has an axial direction that is different from that of the first shaft; a third plate that is pivotably attached to the second plate through the second shaft; a detachable system configured to lock the third plate and the first plate in a state in which the first plate, the second plate, and the third plate are superposed, wherein the detachable system is configured to separate, upon application of force to the third plate that is for rotating the third plate around the second shaft, the third plate from the first plate; a bias system configured to bias the second plate to the first plate in a direction to separate from the second shaft along the first shaft; and a restriction system that is fixed to the second plate, wherein the restriction system is configured to allow the second plate to slide along the first shaft in a state in which the second plate is superposed to the first plate, and the restriction system is configured to restrict the second plate from sliding along the first shaft in a state in which the second plate is rotated with respect to the first plate around the first shaft.

According to an embodiment of the present invention, an opening and closing device and an electronic device can be provided such that a display can be easily taken out from a housing.

BRIEF DESCRIPTION OF THE DRAWINGS

FIGS. 1A and 1B are diagrams showing an electronic device 1 that includes an opening and closing device 100 according to an embodiment;

FIGS. 2A, 2B, 2C, and 2D are diagrams showing the opening and closing device 100 according to the embodiment;

FIGS. 7A and 7B are diagrams showing opening and closing devices 100A and 100B and electronic devices 1A and 1B according to a modified example of the embodiment.

DESCRIPTION OF THE PREFERRED EMBODIMENTS

Figure 3B:
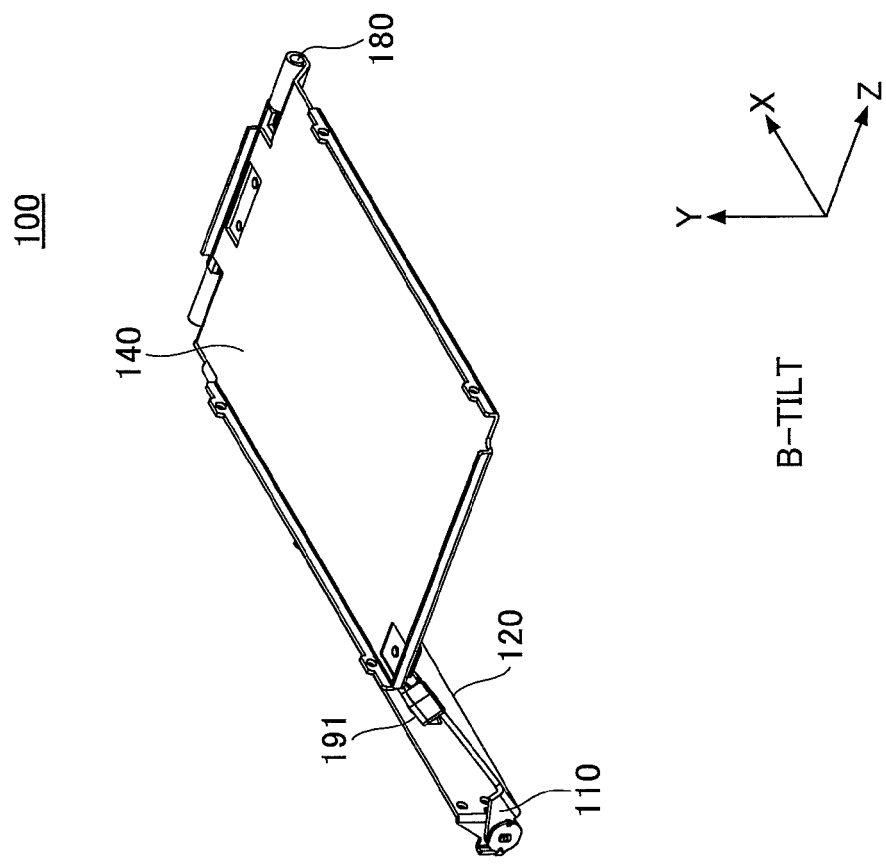
FIGS. 3A and 3B are diagrams showing the opening and closing device 100 according to the embodiment.

Hereinafter, an embodiment is explained in which an opening and closing device and an electronic device according to the present invention are implemented.

Embodiment

FIGS. 1A and 1B are diagrams showing an electronic device 1 that includes an opening and closing device 100 according to the embodiment. The electronic device 1 includes a housing 10; a display panel 20; and the opening and closing device 100. The display panel 20 can be tilted from the housing 10 according to two methods.

Here, as an example, an embodiment is explained in which the electronic device 1 is a digital camera. However, the electronic device 1 is not limited to a digital camera. For example, it can be any electronic device that includes a display panel, such as a camcorder, a gaming device, a tablet computer, and so forth.

Further, in the following, the embodiment is explained in which the display panel 20 is a liquid crystal display (LCD). However, the display panel 20 is not limited to the LCD, and it can be an organic electroluminescence (EL) display or any other thin type display.

The housing 10 includes a housing main body 11; and an LCD housing 12. The LCD housing 12 is attached to a side surface of the display panel 20, and the LCD housing 12 is attached to a part of a rear surface of the display panel 20. The housing 10 can be accommodated in an opening 13 of the housing main body 11.

FIG. 1A shows a state of "A-tilt." FIG. 1B shows a state of "B-tilt." Note that, in the following, an XYZ coordinate system is defined such that a base plate 110 of the opening and closing device 100 is disposed parallel to an XY-plane.

FIGS. 2A-2D, 3A, and 3B are diagrams showing the opening and closing device 100 according to the embodiment. FIG. 4 is a perspective view showing a state in which the opening and closing device 100 according to the embodiment is disassembled.

FIG. 2A is a perspective view showing a closed state. The closed state is a state in which neither the A-tilt nor the B-tilt are executed, and it is said to be a state in which the display panel 20 is completely accommodated in the housing 10. FIGS. 2B-2D are diagrams showing a cross section of a part of the opening and closing device 100, and they show the cross section that can be viewed when a side in a positive direction of the X-axis is viewed from a side in a negative direction of the X-axis.

Figure 3A:
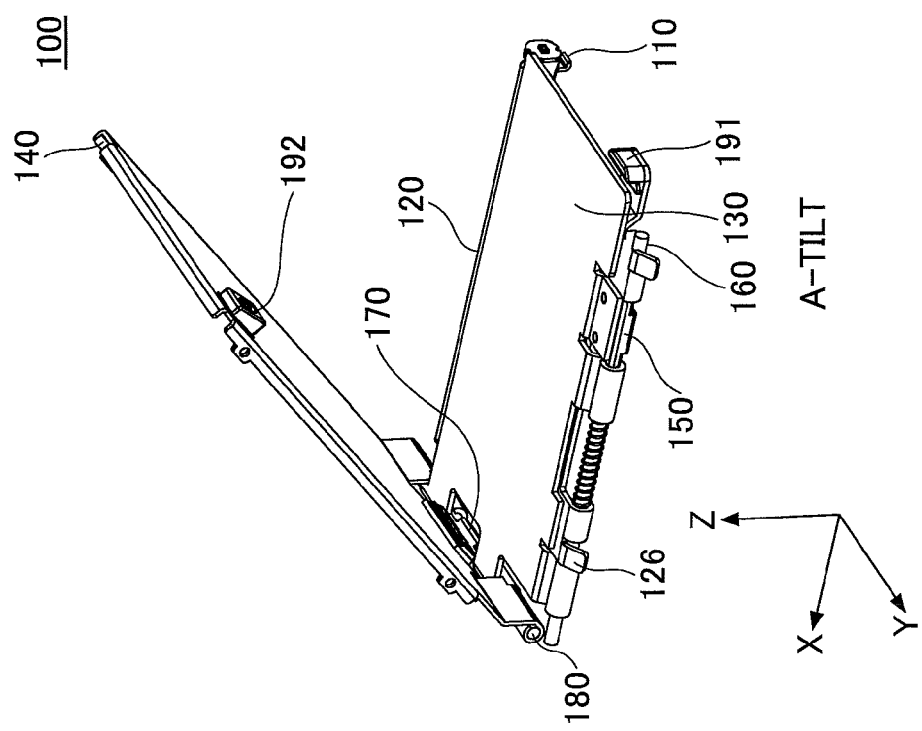
Figure 4:
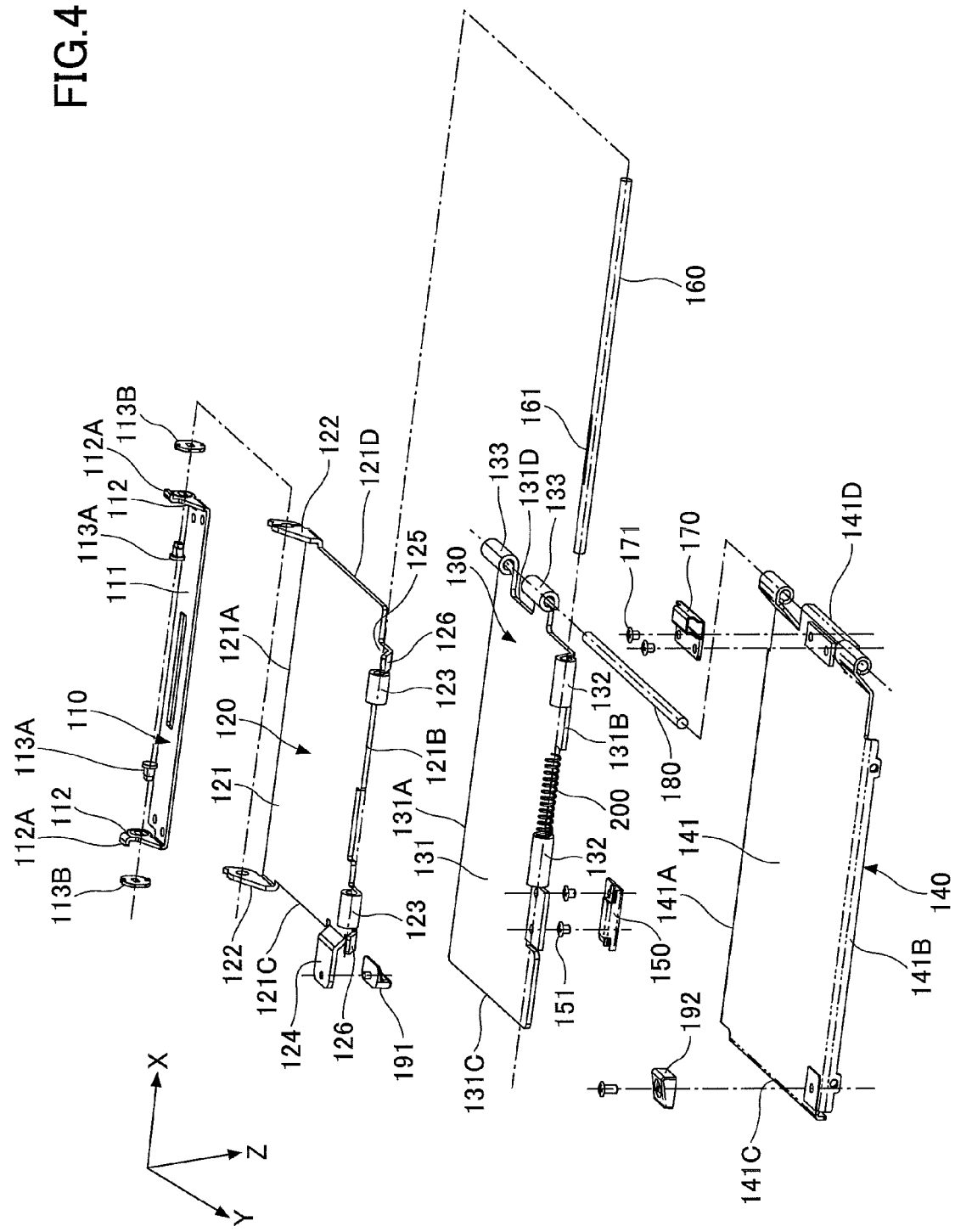
FIG. 4 is a perspective view showing a state in which the opening and closing device 100 according to the embodiment is disassembled.

FIG. 3A is a perspective view showing a state of the A-tilt. FIG. 3B is a perspective view showing a state of the B-tilt.

The opening and closing device 100 includes the base plate 110; hinge plates 120 and 130; an LCD plate 140; a flat spring 150; a tilt shaft 160; a flat spring 170; a tilt shaft 180; a cam system 190; and a spring 200.

The base plate 110 is a plate-shaped member that is to be attached to the housing 10 (cf. FIGS. 1A and 1B). The base plate 110 includes a base 111; bent portions 112; and stoppers 112A. The base 111 is a metal member having an elongated rectangular shape such that its longitudinal direction is in the X-axis direction. The bent portions 112 are portions that are formed by bending both ends in the X-axis direction of the base 111 toward a negative side in the Z-axis direction.

The hinge plate 120 is pivotably attached to the base plate 110 by inserting hinge shafts 113A into openings of the bent portions 112 and fastening them by click plates 113B, respectively. By rotating the hinge plate 120 with respect to the base plate 110, the B-tilt can be achieved.

The stoppers 112A are provided so as to restrict rotational movement after the hinge plate 120 is rotated with respect to the base plate 110. The stoppers 112A are portions that are formed by bending tips of the bent portions 112 toward outside in the X-axis direction. The stoppers 112A can contact a stopper 121A of the hinge plate 120.

Such a base plate 110 can be made by punching out a flat metal plate in a desired shape, and subsequently bending it, for example. As for the flat metal plate, stainless steel can be used, for example.

The hinge plate 120 is an example of a first plate. The hinge plate 120 includes a base 121; bent portions 122; shaft fixing portions 123; a fixing portion 124; and stoppers 125 and 126.

The base 121 is a metal member having a rectangular shape such that the length in the X-axis direction is substantially the same as that of the base 111, and that the width in the Y-axis direction is substantially the same as that of the LCD plate 140. The base 121 has edges 121A, 121B, 121C, and 121D. The edges 121A and 121B are examples of a first edge and a second edge, respectively. Note that it suffices if the hinge plate 120 has the edge 121A and the edge 121B that extends along the edge 121A, and the hinge plate 120 may not have the rectangular shape.

The edge 121A extends along the X-axis at a negative side in the Y-axis direction. The edge 121B extends along the X-axis at a positive side in the Y-axis direction. The edge 121C extends along the Y-axis at a negative side in the X-axis direction. The edge 121D extends along the Y-axis at a positive side in the X-axis direction. Note that the shape of the edge 121B is not linear because the shaft fixing portions 123 and the like are formed. However, the edge 121B extends along the X-axis.

The bent portions 122 are portions that are formed by bending both ends of the base 121 in the X-axis direction toward the negative direction in the Z-axis at the edge in the negative direction of the Y-axis. The bent portions 122 are formed so that they correspond to the bent portions 112. The bent portions 122 have openings corresponding to the openings of the bent portions 112. By inserting the hinge shafts 113A into the openings of the bent portions 112 and the openings of the bent portions 122 and fixing them by the click plates 113B, respectively, the hinge plate 120 can be pivotably attached to the base plate 110. Stoppers 122A that correspond to the stoppers 112A are provided at the bent portions 122, respectively.

The shaft fixing portions 123 are formed so that they protrude from the edge 121B in the positive direction of the Y-axis. Two shaft fixing portions 123 are formed along the edge 121B, and the two shaft fixing portions 123 fix the tilt shaft 160. The tilt shaft 160 may not be rotated because it is fixed to the shaft fixing portions 123.

The fixing portion 124 protrudes in the negative direction of the X-axis at the end portion of the edge 121C in the positive direction of the Y-axis, and the fixing portion 124 is formed so that it is to be offset with respect to the base 121 in the negative direction of the Z-axis. The fixing portion 124 is provided so as to attach a cam portion 191 of the cam system 190 to the hinge plate 120.

The stopper 125 is formed by providing a notch at the end portion of the edge 121B in the positive direction of the X-axis. During transition to the state of the A-tilt, in a state in which the cam portion 191 and a cam portion 192 of the cam system 190 are separated, the hinge plate 130 moves (slides) with respect to the hinge plate 120 in the negative direction of the X-axis. This is for preventing the display panel 20 and the LCD housing 12 (cf. FIG. 1) from being interfered with the housing 10.

In this manner, during movement of of the hinge plate 130 with respect to the hinge plate 120 in the negative direction of the X-axis, the movement of the hinge plate 130 is stopped by contact, with the stopper 125, of a shaft holding portion 132 at a side in the positive direction of the X-axis, between two shaft holding portions 132 of the hinge plate 130. In this manner, the stopper 125 is provided so as to adjust an amount of the movement of the hinge plate 130.

The stopper 126 (cf. FIG. 3A) protrudes from the edge 121B in the positive direction of the Y-axis and in the negative direction of the Z-axis. The stopper 126 is provided so as to limit, during rotation of the hinge plate 130 with respect to the hinge plate 120 for transitioning to the state of the B-tilt, an amount of the rotation by contact with an edge 131A of the hinge plate 130. Though the stopper 126 is not visible in FIG. 3B because it is shaded by the LCD plate 140, the stopper 126 has a configuration such that, upon the hinge plate 130 being rotated approximately by 130 degrees with respect to the hinge plate 120, the hinge plate 130 contacts the stopper 126.

Such a hinge plate 120 can be made by punching out a flat metal plate in a desired shape, and subsequently bending it, for example. As for the flat metal plate, stainless steel can be used, for example.

Here, the embodiment is explained in which the hinge plate 120 is attached to the base plate 110 at the side of the edge 121A. However, it suffices if the hinge plate 120 is attached to the base plate 110 between the side 121A and the side 121B.

Further, the fact that it is attached to the base plate 110 at the side of the edge 121A means that it is attached to the base plate 110 at a side that is closer to the side 121A relative to the side 121B.

The hinge plate 130 is an example of a second plate. The hinge plate 130 includes a base 131; and shaft holding portions 132 and 133.

The base plate 131 is a metal member having a rectangular shape such that the length in the X-axis direction is greater than that of the base 121, and that the width in the Y-axis direction is less than that of the base 121. The base 131 includes edges 131A, 131B, 131C, and 131D. The positional relationship among the edges 131A-131D is the same as that of the edges 121A-121D. The edges 131B and 131D are examples of a third edge and a fourth edge, respectively. Note that it suffices if the hinge plate 130 includes the edge 131B and the edge 131O that are adjacent each other, and the hinge plate 130 may not have a rectangular shape.

The shaft holding portions 132 are formed so that they protrude from the edge 131B in the positive direction of the Y-axis. Two shaft holding portions 132 are formed along the edge 131B, and they pivotably hold the tilt shaft 160. Consequently, the hinge plate 130 can be rotated with respect to the tilt shaft 160.

The shaft holding portions 133 are formed so that they protrude from the edge 131D in the positive direction of the X-axis. Two shaft holding portions 133 are formed along the edge 131D, and they pivotably hold the tilt shaft 180. Consequently, the hinge plate 130 can be rotated with respect to the tilt shaft 180.

Such a hinge plate 130 can be made by punching out a flat metal plate in a desired shape, and subsequently bending it, for example. As for the flat metal plate, stainless steel can be used, for example.

Here, the embodiment is explained in which the hinge plate 130 is pivotably attached to the tilt shaft 160 at the edge 131B. However, it suffices if the hinge plate 130 is attached to the tilt shaft 160 at a side of the edge 131B. The side of the edge 131B is said to be a side that is closer to the edge 131B relative to the edge 131A.

Further, the embodiment is explained here such that the hinge plate 130 includes the shaft holding portions 132, and that the shaft holding portions 132 pivotably hold the tilt shaft 160. However, the hinge plate 130 may include, instead of the shaft holding portions 132, a shaft fixing portion that fixedly holds the tilt shaft 160. In this case, the flat spring 150 may be attached to the hinge plate 120, and the tilt shaft 160 may be fixed to the hinge plate 130.

The LCD plate 140 is a metal member for holding the display panel 20, and it is an example of a third plate. The LCD plate 140 includes a base 141; and shaft fixing portions 142.

The base 141 is a metal member having a rectangular shape such that the length in the X-axis direction is greater than that of the base 131, and that the width in the Y-axis direction is greater than that of the base 131. The base 141 includes edges 141A, 141B, 141C, and 141D. The positional relationship among the edges 141A-141D is the same as the positional relation ship among the edges 121A-121D. The edges 141D and 141C are examples of a fifth edge and a sixth edge, respectively. Note that it suffices if the LCD plate 140 includes the edge 141D and the edge 141C that extends along the edge 141D. The LCD plate 140 may not have a rectangular shape.

The shaft fixing portions 142 are formed so that they protrude from the edge 141D in the positive direction of the X-axis. Two shaft fixing portions 142 are formed along the edge 141D, and they fix the tilt shaft 180. The tilt shaft 180 may not be rotated because it is fixed to the shaft fixing portions 142.

Such an LCD plate 140 can be made by punching out a flat metal plate in a desired shape, and subsequently bending it, for example. As for the flat metal plate, stainless steel can be used, for example.

Here, the embodiment is explained such that the LCD plate 140 is pivotably attached to the hinge plate 130 through the tilt shaft 180 at the edge 141D. However, it suffices if the LCD plate 140 is pivotably attached to the hinge plate 130 at a side of the edge 141D. The side of the edge 141D is said to be a side that is closer to the edge 141D relative to the edge 141C.

Further, the embodiment is explained here such that the LCD plate 140 includes the shaft fixing portions 142, and that the shaft fixing portions 142 are fixed to the tilt shaft 180. However, the LCD plate 140 may include, instead of the shaft fixing portions 142, a shaft holding portion that pivotably holds the tilt shaft 180. In this case, the flat spring 170 may be attached to the LCD plate 140, and the tilt shaft 180 may be fixed to the hinge plate 130.

The flat spring 150 is an example of a first flat spring and a restriction system that are made by bending a flat metal plate. The flat spring 150 is fixed to the hinge plate 130 by screws 151. The tilt shaft 160 is inserted into the flat spring 150. The flat spring 150 has a configuration such that restoring force that is generated at a portion where the tilt shaft 160 is nipped is varied depending on an angle of the flat spring 150 with respect to a notch 161 of the tilt shaft 160.

For the flat spring 150, a spring constant is set so that, during transition to the state of the A-tilt, in a state in which the hinge plate 130 is closed with respect to the hinge plate 120, upon the hinge plate 130 being pressed with respect to the hinge plate 120 in the negative direction of the X-axis by restoring force of the spring 200, the hinge plate 130 can be moved along the tilt shaft 160 (a thrust direction).

In addition, for the flat spring 150, the spring constant is set so that, during transition to the state of the B-tilt, even if the hinge plate 130 is pressed with respect to the hinge plate 120 in the negative direction of the X-axis by restoring force of the spring 200, restoring force for restricting movement of the hinge plate 130 along the tilt shaft 160 is generated by pressing of the tilt shaft 160 by the flat spring 150.

Such a flat spring 150 can be made by punching out a flat metal plate in a desired shape, and subsequently bending it, for example. As for the flat metal plate, stainless steel can be used, for example.

Here, the embodiment is explained in which the flat spring 150 is used as an example of the restriction system. However, the restriction system may have a configuration other than the flat spring 150, provided that the system allows, during transition to the state of the A-tilt, in a state in which the hinge plate 130 is closed with respect to the hinge plate 120, the hinge plate 130 to move with respect to the hinge plate 120 along the tilt shaft 160, and during transition to the state of the B-tilt, the system can restrict movement of the hinge plate 130 along the tilt shaft 160.

The tilt shaft 160 is an example of a first shaft, and the tilt shaft 160 is a metal member having a rod shape whose cross section has a round shape. The tilt shaft 160 is fixed by the two shaft fixing portions 123, and the tilt shaft 160 is inserted into the two shaft holding portions 132 and into the flat spring 150. The tilt shaft 160 has the notch 161 at a portion that is inserted into the flat spring 150.

As shown in FIG. 2B, the notch 161 is a part that is formed to be flat by cutting and removing a part of an outer peripheral surface of the tilt shaft 160 having a cylindrical shape. As shown in FIG. 2B, a size "a" of inside the flat spring 150 during a state in which the notch 161 contacts an inner surface of the flat spring 150 is adjusted to fit the size of the tilt shaft 160 in a direction that is perpendicular to the notch 161 and that passes through a central axis of the tilt shaft 160. Consequently, in the state that is shown in FIG. 2B, no restoring force is generated in the flat spring 150.

As shown in FIG. 2C, a size "b" of inside the flat spring 150 during a state in which the notch 161 does not contact the inner surface of the flat spring 150 is greater than the size "a" that is shown in FIG. 2B. In other words, a<b is satisfied. That is because in the state in which the notch 161 is not contacted, the flat spring 150 is widened. Then, in the state that is shown in FIG. 2C, restoring force for pressing the tilt shaft 160 is generated in the flat spring 150.

In the embodiment, as shown in FIG. 2A, in the state in which the hinge plate 130 is closed with respect to the hinge plate 120, the position of the notch 161 is adjusted so that the state of the cross section of FIG. 2B is achieved. Further, arrangement is made so that the state of the cross section of FIG. 2C is achieved upon the hinge plate 130 being rotated and opened with respect to the hinge plate 120.

Here, arrangement may be made so that, in the state in which the hinge plate 130 is closed with respect to the hinge plate 120 as shown in FIG. 2A, the notch 161 does not contact the inner surface of the flat spring 150 as shown in FIG. 2D, and upon the hinge plate 130 being rotated slightly with respect to the hinge plate 120, the notch 161 contacts the inner surface of the flat spring 150.

In this case, however, it is necessary that restoring force that is generated in the flat spring 150 is sufficiently small, so that the flat spring 150 can be moved with respect to the tilt shaft 160 in the direction of the shaft.

The flat spring 170 is an example of a second flat spring that is made by bending a flat metal plate, and the flat spring 170 is fixed to the hinge plate 130 by screws 171. The tilt shaft 180 is inserted into the flat spring 170. The flat spring 170 has a configuration such that restoring force that is generated at a portion where the tilt shaft 180 is nipped is varied depending on an angle of the flat spring 180 with respect to a notch of the tilt shaft 180. This is the same as the relationship between the flat spring 150 and the tilt shaft 160.

Such a flat spring 170 can be made by punching out a flat metal plate in a desired shape, and subsequently bending it, for example. As for the flat metal plate, stainless steel can be used, for example.

The tilt shaft 180 is an example of a second shaft, and the tilt shaft 180 is a metal member having a rod shape whose cross section has a round shape. The tilt shaft 180 is fixed by the two shaft fixing portions 142, and the tilt shaft 180 is inserted into the two shaft holding portions 133 and into the flat spring 170. The tilt shaft 180 has a notch at a portion that is inserted into the flat spring 170. Here, depiction of a configuration of the notch of the tilt shaft 180 is omitted because it is the same as the notch 161 of the tilt shaft 160.

The cam system 190 is an example of a detachable system, and the cam system 190 includes the cam portions 191 and 192. The cam portions 191 and 192 are examples of a first cam portion and a second cam portion, respectively. The cam portion 191 is attached to a surface of the fixing portion 124 of the hinge plate 120 in the positive direction of the Z-axis. The cam portion 192 is attached to a surface of the LCD plate 140 in the negative direction of the Z-axis in the vicinity of an apex between the edge 141B and the edge 141C.

As shown in FIG. 2A, in the state in which the hinge plates 120 and 130, and the LCD plate 140 are closed, the cam portions 191 and 192 are mutually locked, and the hinge plate 120 and the LCD plate 140 are fixed.

Upon the display panel 20 being opened by a user of the electronic device 1 (cf. FIG. 1) so as to let the display panel 20 be in the state of the B-tilt, opening force is applied to the LCD plate 140, and the cam portion 192 is separated from the cam portion 191.

The spring 200 is an example of a bias system. The spring 200 is wound around the tilt shaft 160 between the shaft fixing portion 123 of the two shaft fixing portions 123 that is at a side in the positive direction of the X-axis and the shaft holding portion 132 of the two shaft holding portions 132 that is at a side in the negative direction of the X-axis. As shown in FIG. 2A, in a state in which the hinge plate 120 and the hinge plate 130 are fixed by the cam system 190, the spring 200 is provided between the shaft fixing portion 123 and the shaft holding portion 132 in a state in which it is shrunk relative to its original length.

In addition, the length of the spring 200 is set so that the spring 200 is shrunk relative to its original length in a state in which the shaft holding portion 132 of the two shaft holding portions 132 of the hinge plate 130 that is at a side in the positive direction of the X-axis contacts the stopper 125.

The spring constant of the spring 200 is set as follows. The spring constant is set so that, during transition to the state of the A-tilt, in a state in which the hinge plate 130 is closed with respect to the hinge plate 120, the flat spring 150 and the hinge plate 130 can be pressed to the hinge plate 120 toward a side in the negative direction of the X-axis.

In addition, the spring constant of the spring 200 is set so that, during transition to the state of the B-tilt, movement, by restoring force of the spring 200, of the hinge plate 130 along the tilt shaft 160 is restricted by pressing of the tilt shaft 160 by the flat spring 150.

Here, the embodiment is explained in which the spring 200 is used as an example of the bias system. However, the bias system may have a configuration other than the spring 200, provided that the system can generate biasing force for pressing the flat spring 150 and the hinge plate 130 to the hinge plate 120 toward a side in the negative direction of the X-axis. For example, it may not be wound around the tilt shaft 160, and it can be a flat spring.

Next, there are explained an operation for transition to the state of the A-tilt and an operation for transition to the state of the B-tilt.

Figure 5A:
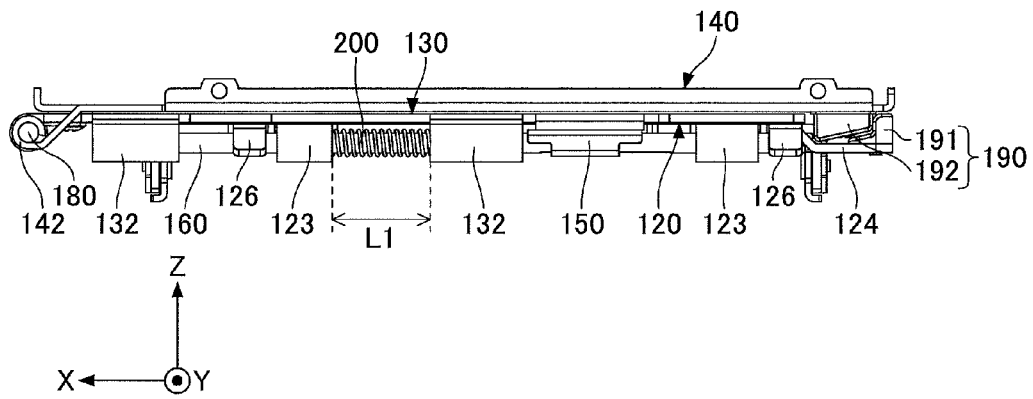
FIGS. 5A, 5B, and 5C are side views showing an operation for transitioning to a state of A-tilt.
Figure 5B:
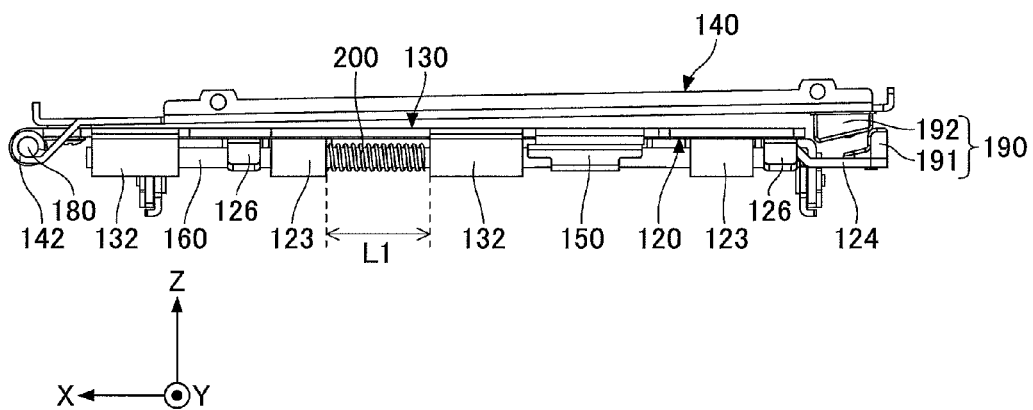
Figure 5C:
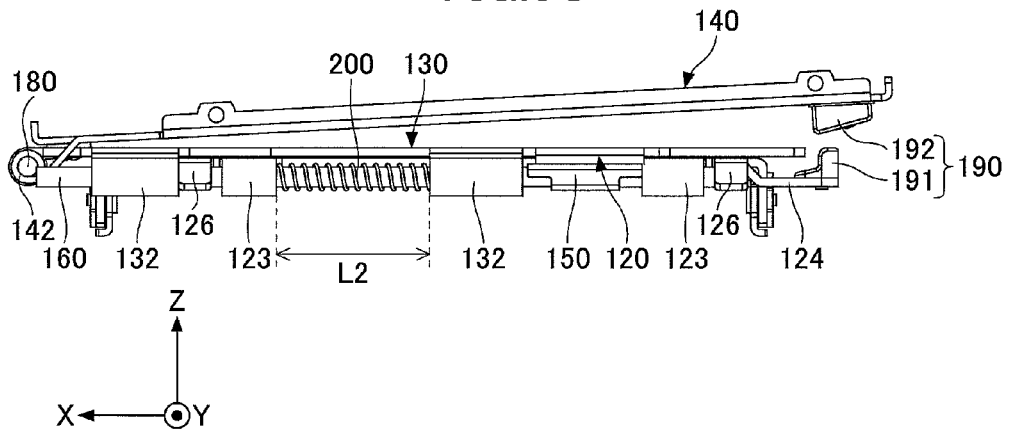

FIGS. 5A-5C are side views showing an operation for transition to the state of the A-tilt.

In the state that is shown in FIG. 5A, the hinge plates 120 and 130, and the LCD plate 140 are closed, and the hinge plate 120 and the LCD plate 140 are fixed by the cam system 190. At this time, the length of the spring 200 is L1.

Next, upon the display panel 20 being opened while being rotated with respect to the tilt shaft 180 by a user of the electronic device 1 (cf. FIG. 1) so as to let the display panel 20 be in the state of the A-tilt, as shown in FIG. 5B, the cam portion 192 starts separating from the cam portion 191 of the cam system 190, as the end portion of the LCD plate 140 at a side in the negative direction of the X-axis moves toward a side in the positive direction of the Z-axis.

The state that is shown in FIG. 5B is a state that is immediately prior to the cam portion 191 being completely separated from the cam portion 192. Thus, the position of the hinge plate 130 is the same as the position shown in FIG. 5A, and the length of the spring 200 is L1.

Further, restoring force is not generated in the flat spring 150 because the hinge plate 130 is not rotated with respect to the tilt shaft 160.

Upon the display panel 20 being further opened by the user, as shown in FIG. 5C, the cam portion 192 is separated from the cam portion 191 of the cam system 190. In this state, the hinge plate 130 is not rotated with respect to the tilt shaft 160, and the hinge plate 120 can be moved along the tilt shaft 160 in the X-axis direction. Thus, the hinge plate 130 is pressed and moved, by the restoring force of the spring 200, to the hinge plate 120 in the negative direction of the X-axis.

Then, the hinge plate 130 is stopped by the contact of the shaft holding portion 132 with the stopper 125. At this time, the length of the spring 200 is L2 (>L1). The difference between the length L1 and the length L2 is an amount of the movement of the hinge plate 130 with respect to the hinge plate 120. Namely, an amount of the movement of the hinge plate 130 can be determined by the position of the stopper 125.

Accordingly, an amount of movement of the display panel 20 in the negative direction of the X-axis can be set so that the display panel 20 does not interfere with the housing 10 during opening the display panel 20 for transition to the state of the A-tilt.

Further, for accommodating the display panel 20 from the state that is shown in FIG. 5C, by pressing the display panel 20 while sliding the display panel 20 in the positive direction of the X-axis against the restoring force of the spring 200, the cam portions 191 and 192 start being locked as shown in FIG. 5B. Upon further pressing the display panel 20, the display panel 20 is guided toward a side in the positive direction of the X-axis by the cam portions 191 and 192, the state returns to the closed state that is shown in FIG. 5A, and the LCD plate 140 is completely fixed to the hinge plate 120.

Figure 6A:
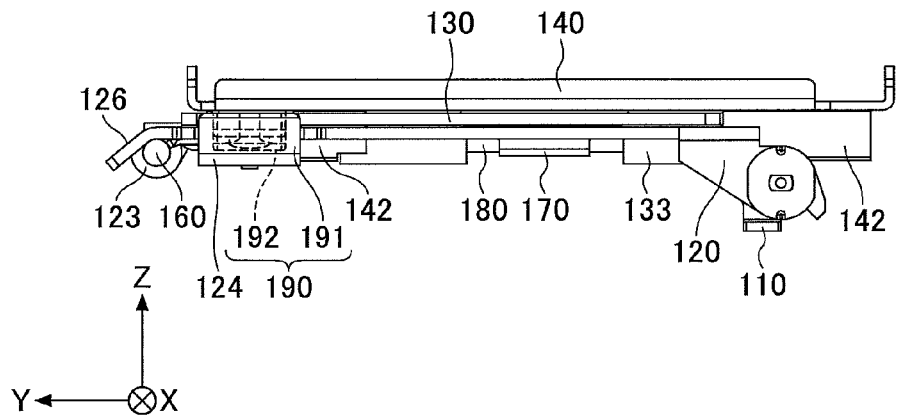
FIGS. 6A, 6B, and 6C are side views showing an operation for transitioning to a state of B-tilt.
Figure 6B:
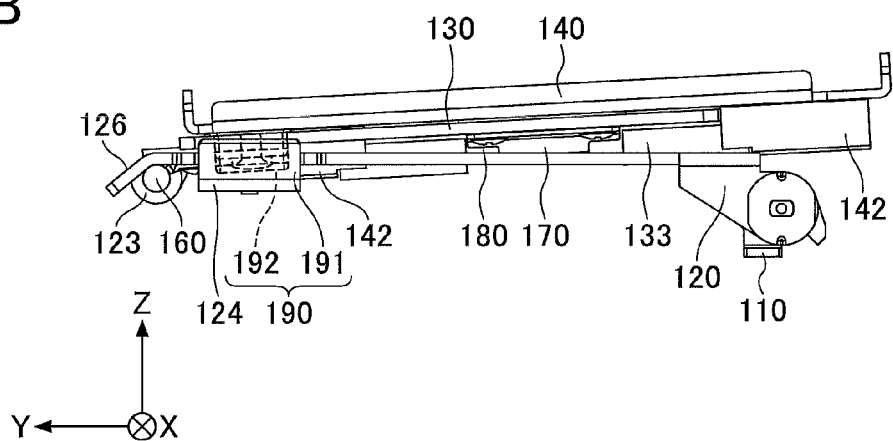
Figure 6C:
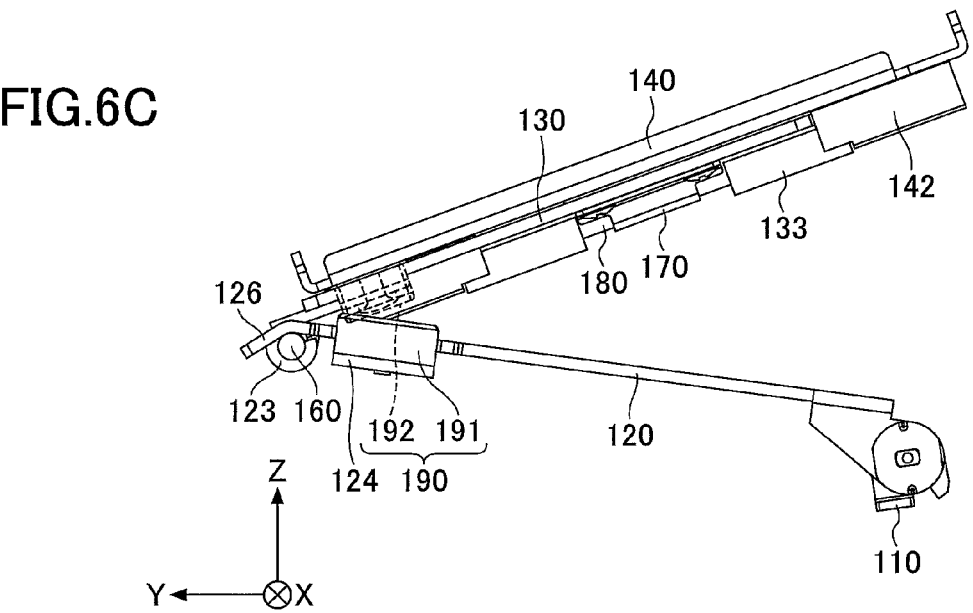

FIGS. 6A-6C are side views showing an operation for transition to the state of the B-tilt.

In the state that is shown in FIG. 6A, the hinge plates 120 and 130, and the LCD plate 140 are closed, and the hinge plate 120 and the LCD plate 140 are fixed by the cam system 190.

Next, upon the display panel 20 being opened while being rotated with respect to the tilt shaft 160 by a user of the electronic device 1 (cf. FIG. 1) so as to let the display panel 20 be in the state of the B-tilt, as shown in FIG. 6B, the cam portion 192 starts separating from the cam portion 191 of the cam system 190, as the end portion of the hinge plate 130 and the LCD plate 140 at a side in the positive direction of the Y-axis moves toward a side in the positive direction of the Z-axis.

Upon the display panel 20 being further opened by the user, as shown in FIG. 6C, the cam portion 192 is separated from the cam portion 191 of the cam system 190. At this time, the hinge plate 130 is sufficiently rotated with respect to the tilt shaft 160. Thus, the restoring force of the flat spring 150 (cf. FIG. 2) for pressing the tilt shaft 160 is increased, and movement of the hinge plate 130 in the axis direction of the tilt axis 160 is restricted.

That is because the restoring force of the flat spring 150 is set so that movement of the hinge plate 130 along the tilt axis 160 is restricted by pressing of the tilt axis 160 by the flat spring 150, even if the hinge plate 130 is pressed to the hinge plate 120 toward a side in the negative direction of the X-axis by the restoring force of the spring 200.

Consequently, the display panel 20 can be prevented from being shifted in the axis direction of the tilt shaft 160 during rotation of the display panel 20 with respect to the tilt shaft 160 for transition to the state of the B-tilt.

Note that, in this manner, in the state in which the tilt shaft 160 is pressed by the flat spring 150, movement is restricted in the axis direction (the thrust direction) of the tilt shaft 160, but movement in the rotational direction is not restricted. Thus, the hinge plate 130 can be rotated with respect to the tilt shaft 160, so that the hinge plate 130 can be opened with respect to the hinge plate 120 until a desired angle.

Further, during accommodation of the display panel 20 from the state of the B-tilt that is shown in FIG. 6C, after the display panel 20 is rotated until the state that is shown in FIG. 6B, the restoring force for pressing the tilt shaft 160 by the flat spring 150 is decreased. However, by start of locking between the cam portions 191 and 192, locking between the LCD plate 140 and the hinge plate 120 is started. Then, the display panel 20 is guided by the cam portions 191 and 192, and the state returns to the closed state that is shown in FIG. 6A.

As described above, according to the embodiment, the opening and closing device 100 and the electronic device 1 can be provided such that, during transition from the state in which the display panel 20 is accommodated in the housing 10 to the state of the A-tilt, the state of the A-tilt can be easily and securely achieved without the housing 10 being interfered by the LCD housing 12 and the display panel 20.

Further, according to the embodiment, the opening and closing device 100 and the electronic device 1 can be provided such that, during transition from the state in which the display panel 20 is accommodated in the housing 10 to the state of the B-tilt, the state of the B-tilt can be easily and securely achieved without shifting the LCD housing 12 and the display panel 20 with respect to the housing 10 in the Y-axis direction.

Thus, according to the embodiment, the opening and closing device 100 and the electronic device 1 can be provided such that the display panel 20 can be easily taken out (tilted up) from the housing 10.

Hereinafter, the opening and closing device and the electronic device according to a modified example of the embodiment is explained by using FIG. 7.

FIGS. 7A and 7B are diagrams showing the opening and closing devices 100A and 100B and the electronic devices 1A and 1B according to the modified example of the embodiment.

The electronic device 1A that is shown in FIG. 7A includes, instead of the housing 10 and the opening and closing device 100 of the electronic device 1 that is shown in FIG. 1, a housing 10A and an opening and closing device 100A.

The opening and closing device 100A includes, instead of the cam portion 192 of the opening and closing device 100 that is shown in FIG. 2, a cam portion 14A. Further, the housing 10A includes a housing main body 11A; and an LCD housing 12A. The LCD housing 12A and the display 20 can be accommodated in an opening 13A of the housing main body 11A. Further, the cam portion 14A is provided in the LCD housing 12A. The cam portion 14A has a configuration that is the same as that of the cam portion 192, and the cam portion 14A can be locked with the cam portion 191. Namely, the cam portion 191 and the cam portion 14A achieve the same function and operation as those of the cam system 190 that is shown in FIG. 2.

In this manner, the cam portion 14A that is provided in the LCD housing 12A of the housing 10A can be used instead of the cam portion 192. The cam portion 14A is provided in the LCD housing 12A, and the LCD housing 12A is an example of a fixing member that is fixed to the LCD display 140 directly, or indirectly through the display panel 20.

Further, the electronic device 1B that is shown in FIG. 7B includes a housing 10B; and an opening and closing device 100B, instead of the housing 10 and the opening and closing device 100 of the electronic device 1 that is shown in FIG. 1. The opening and closing device 100B is different from the opening and closing device 100 that is shown in FIGS. 1 and 2 in the operating direction of the A-tilt. Namely, in the opening and closing device 100B, the tilt shaft 180 that is shown in FIG. 2 is located at a side in the negative direction of the X-axis, and the cam system 190 is located at a side in the positive direction of the X-axis.

The housing 10B is formed by applying modification in accordance with such modification. The housing 10B includes a housing main body 11B; and the LCD housing 12B. The LCD housing 12B and the display panel 20 can be accommodated in an opening 13B of the housing main body 11B.

In a case in which the opening and closing device 100B operates as shown in FIG. 7B, by setting an amount of movement of the hinge plate 130 with respect to the hinge plate 120 toward a side in the negative direction of the X-axis, so that the display panel 20 can be rotated by 180 degrees for achieving the A-tilt, a photograph can be taken while confirming an image by the display 20 when a user takes a self-portrait. Thus, it is convenient.

In this manner, the operation of the A-tilt can be achieved as an operation that is opposite to the operation that is shown in FIG. 1A.

The opening and closing device and the electronic device according to exemplary embodiment of the present invention are described above. However, the present invention is not limited to the specifically disclosed embodiment, and various modifications and alterations can be made without departing from the scope of the claims.

What is claimed is:

1. An opening and closing device comprising:
a base plate;
a first plate that is pivotably attached to the base plate;
a first shaft that is provided in the first plate;
a second plate that is pivotably and slidably attached to the first plate through the first shaft;
a second shaft that is provided in the second plate, wherein the second shaft has an axis direction that is different from that of the first shaft;
a third plate that is pivotably attached to the second plate through the second shaft;
a detachable system configured to lock the third plate and the first plate in a state in which the first plate, the second plate, and the third plate are superposed, wherein the detachable system is configured to separate, upon application of force to the third plate that is for rotating the third plate around the second shaft, the third plate from the first plate;
a bias system configured to bias the second plate to the first plate in a direction to separate from the second shaft along the first shaft; and
a restriction system that is fixed to the second plate, wherein the restriction system is configured to allow the second plate to slide along the first shaft in a state in which the second plate is superposed to the first plate, and the restriction system is configured to restrict the second plate from sliding along the first shaft in a state in which the second plate is rotated with respect to the first plate around the first shaft.

2. The opening and closing device according to claim 1, wherein force by the restriction system that is for restricting the second plate from sliding is greater than bias force by the bias system.

3. The opening and closing device according to claim 1, wherein the first plate is formed of a plate member having a first edge and a second edge that extends along the first edge, wherein the first plate is pivotably attached to the base plate at a side of the first edge;

wherein the second plate is formed of a plate member having a third edge and a fourth edge that are adjacent to each other, wherein the second plate is pivotably and slidably attached to the first plate through the first shaft at a side of the third edge; and
wherein the third plate is formed of a plate member having a fifth edge and a sixth edge that extends along the fifth edge, wherein the third plate is pivotably attached to the second plate through the second shaft at a side of the fifth edge.

4. The opening and closing device according to claim 3, wherein the first plate includes a stopper that is formed at the second edge, wherein the stopper is configured to restrict the second plate from sliding with respect to the first plate in a direction to separate from the second shaft in the axis direction of the first shaft.

5. The opening and closing device according to claim 3, wherein the detachable system is configured to lock a portion of the third plate at a side of the sixth edge to the first plate and configured to separate the portion of the third plate at the side of the sixth edge from the first plate.

6. The opening and closing device according to claim 1, wherein the detachable system is a cam system having a first cam portion that is to be attached to the first plate, and a second cam portion that is to be attached to the third plate.

7. The opening and closing device according to claim 1, wherein the detachable system is a cam system having a first cam portion that is to be attached to the first plate, and a second cam portion that is to be attached to a fixing member, wherein the fixing member is to be fixed to the third plate.

8. The opening and closing device according to claim 6, wherein the first cam portion of the cam system is configured to guide, during superposing the third plate on the second plate from a state in which the third plate is rotated with respect to the second plate, the second cam portion in the axis direction of the first shaft.

9. The opening and closing device according to claim 1, wherein the first shaft includes a first notch along the axis direction,
wherein the restriction system is a first flat spring into which the first shaft is to be inserted,
wherein the restriction system is configured to allow, in a state in which the second plate is superposed on the first plate, the second plate to slide along the first shaft by cooperating with the first notch of the first shaft, and
wherein the restriction system is configured to restrict, in a state in which the second plated is rotated with respect to the first plate around the first shaft, the second plate from sliding along the first shaft.

10. The opening and closing device according to claim 1, further comprising:
a second flat spring that is fixed to the third plate and into which the second shaft is to be inserted,
wherein the second shaft includes a second notch along the axis direction, and
wherein, in a state in which the third plate is superposed on the second plate, the second notch contacts the second flat spring.

11. An electronic device comprising:
a housing;
an opening and closing device including a base plate; a first plate that is pivotably attached to the base plate; a first shaft that is provided in the first plate; a second plate that is pivotably and slidably attached to the first plate through the first shaft; a second shaft that is provided in the second plate, wherein the second shaft has an axis direction that is different from that of the first shaft; a third plate that is pivotably attached to the second plate through the second shaft; a detachable system configured to lock the third plate and the first plate in a state in which the first plate, the second plate, and the third plate are superposed, wherein the detachable system is configured to separate, upon application of force to the third plate that is for rotating the third plate around the second shaft, the third plate from the first plate; a bias system configured to bias the second plate to the first plate in a direction to separate from the second shaft along the first shaft; and a restriction system that is fixed to the second plate, wherein the restriction system is configured to allow the second plate to slide along the first shaft in a state in which the second plate is superposed to the first plate, and the restriction system is configured to restrict the second plate from sliding along the first shaft in a state in which the second plate is rotated with respect to the first plate around the first shaft, wherein the base plate is to be attached to the housing; and a display panel that is to be attached to the third plate, wherein the display panel is to be exposed from the housing.

\* \* \* \* \*